United States Patent [19]

Pierrat

[11] 4,310,851

[45] Jan. 12, 1982

[54] SIGHTING DEVICE FOR REAR FIRING ON COMBAT AIRCRAFT

[75] Inventor: Jean Pierrat, Versailles, France

[73] Assignee: Avions Marcel Dassault-Breguet Aviation, Vaucresson, France

[21] Appl. No.: 41,489

[22] Filed: May 22, 1979

[30] Foreign Application Priority Data

May 22, 1978 [FR] France .................. 78 15060

[51] Int. Cl.³ .................. H04H 7/18; F41G 1/06
[52] U.S. Cl. .................. 358/109; 89/41 TV; 89/41 EA
[58] Field of Search ............ 358/108, 109; 89/41 EA, 89/41 TV

[56] References Cited

U.S. PATENT DOCUMENTS 4,034,401 7/1977 Mann .................. 358/109

FOREIGN PATENT DOCUMENTS 492020 9/1938 United Kingdom ............ 89/41 EA
1155807 6/1969 United Kingdom ............ 358/108
1176371 1/1970 United Kingdom ............ 358/109

Primary Examiner—Robert L. Richardson
Assistant Examiner—Edward L. Coles
Attorney, Agent, or Firm—William J. Daniel

[57] ABSTRACT

An aircraft is equipped with a rearwardly pointed television camera connected to an electronic receiver situated in front of the pilot. The image provided by the camera at the receiver appears in mirror reversed inverted or symmetrically opposite position, in order that the maneuvers required for rearward firing can be carried out by the common piloting reflexes for forward firing.

3 Claims, 3 Drawing Figures

U.S. Patent
Jan. 12, 1982
4,310,851
FIG.:1
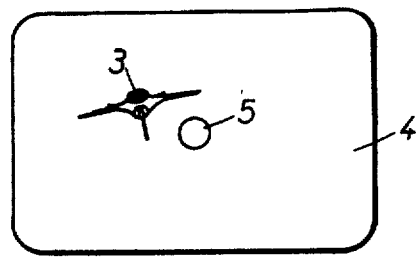
FIG.:2
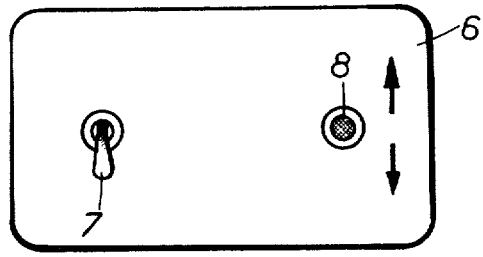
FIG.:3

SIGHTING DEVICE FOR REAR FIRING ON COMBAT AIRCRAFT

The present invention concerns a sighting device for rearward firing or retro-sighting device to be used on combat aircraft.

It is applicable to every craft equipped with rearwardly pointing defense means such as guns or rockets arranged for rearward firing.

The main object of this invention is to provide a retro-sighting device enabling the pilot to see and identify a hostile apparatus attacking from the rear, and then to effect an aiming which consists in aligning the firing axis with the hostile apparatus while going on with the normal piloting of the aircraft.

In order to simplify the present pilot's task, the retrosighting device is arranged so that the maneuver to be effected requires only the ordinary reflexes from the pilot as would be used when firing forwardly.

Furthermore, as for forward firing, it is desirable to introduce automatic sighting corrections in accordance with the ballistics and with the characteristics of the utilized weapons, the maneuvers (angular speeds) of the aircraft, the distance of the target, the air density and so on.

The present invention provides to this effect an electronic solution well adapted to modern combat aircraft. In this solution, the aircraft is equipped with a rearwardly pointing TV camera connected to an electronic receiver fitted in the cockpit and on which the image delivered by the camera appears in mirror reversed and inverted relation, that is to say, symmetrically opposite, to the true position of the target in relation to the firing axis of the aircraft. A sighting reticle, the position of which is determined by means of a firing computer, is moreover superposed upon the image.

In the accompanying drawings:

FIG. 1 is a diagrammatic elevation with partial longitudinal secion of an aircraft equipped in accordance with the invention.

FIG. 2 is a frontal view of the image as seen by the pilot.

FIG. 3 shows the control panel for effecting image reversal and field variation.

The solution proposed by the invention requires a rearwardly pointing TV camera 1 which may be fitted in a wing tip or a top housing (as illustrated in FIG. 1) or at the bottom of a fin or in any other convenient place offering a sufficiently open visibility toward the rear.

The image delivered by this camera is presented to the pilot on a receiver 2 located preferably on the control panel. The sighting device already existing on modern assault aircraft may be conveniently used for this purpose.

FIG. 2 illustrates an example of the TV image as presented to, i.e., seen by, the pilot. By proper wiring connecting the camera to the receiver, the image 3 of the hostile aircraft appears reversed on the screen 4 of the receiver device, so that an upward displacement of the hostile aircraft causes a downward displacement of the image, and conversely. Likewise, a displacement of the hostile aircraft to the right causes a displacement of the image to the left, and conversely.

In addition to the image delivered by the camera, a sighting reticle 5 is provided; it is generated by an electronic circuit associated with the receiver, and its position is determined by an aiming computer, indicated at 4 in FIG. 3, which takes into account the characteristics of the specific weapon being, utilized, its disposition on the aircraft, the movements of the carrier aircraft and more generally all the parameters usually taken into account in modern aiming computers.

The computer could be the one fitted on the aircraft, which already receives all the necessary data and to which it will be enough to add the logic corresponding to the particular mode of operation.

All the pilot has to do is to control his aircraft so as to superpose the firing reticle on the image of the aircraft in order to trigger firing under the best conditions.

The desired reversal of both directions of displacement of the TV image relative to the actual rear view renders piloting instinctive.

In the case of FIG. 2, it is assumed that the ennemy aircraft which comes from the rear is located underneath and to the right of the firing axis. The pilot should nose up the aircraft (by pulling on the control stick) and bank towards the left in order to superpose the reticle 5 upon the image 3 of the aircraft, thus aligning his firing axis on the enemy, precisely, as if the target were in front of him.

A noteworthy advantage of the proposed solution consists in the possibility for the pilot to adjust the extend of the surveyed field, either by remote control of a variable focal-length or zoom objective fitted on the TV camera or by variation of the scanning speed of the cathode ray tube or a combination of the two.

The broadest of view allows a general survey of the rear sector, whereas a restricted field leads to a magnified image which facilitates identification of the attacking aircraft and improves firing accuracy.

If the inverted presentation of the hostile aircraft happens to be considered as awkward or confusing for survey and identification, it is easy to provide for a switch enabling the pilot, whenever he feels like it, to restore the normal relation of the image, while retaining the possibility of switching back to image reversal for instinctive piloting of the attack phase.

FIG. 3 illustrates a possible arrangement, on the control panel 6, of an image reverser switch 7 switchable from "normal" to "reverse", and a zoom control 8 for camera field variation.

Of course, the camera is equipped with conventional automatic diaphragm control by photo-cell, and the TV receiver is likewise equipped with conventional adjustments—whether by hand or automatic—for, say, luminosity, constrast, etc.

I claim:

1. Method of sighting for rearward firing on a combat aircraft carrying a rearwardly directed weapon arranged thereon for firing along an axis which is brought into firing alignment with a rearwardly positioned target by maneuvering the flight direction of the aircraft, said combat aircraft being equipped with a television camera pointing towards the rear and an electronic receiver situated in front of the pilot, said method comprising the step of connecting the output of said camera to the input of said receiver in such a way that the image delivered by the camera appears on the receiver in a position symmetrically opposite to the true rearward position of the target in relation to said firing axis, whereby the firing maneuvers needed to be carried out by the pilot to aim the aircraft at a rearwardly located object can be performed in accordance with the normal piloting reflexes for forward aiming.

2. Method as claimed in claim 1, comprising the further steps of generating a sighting reticle to be formed on the electronic receiver and superposing said reticle upon the image received at the receiver from the camera.

3. Method as claimed in claim 1, comprising the further step of optionally switching the connection between the camera and the receiver to restore the TV image to "normal" relation to the actual rear view.

* * * * *